US009995231B2

(12) United States Patent
Kim et al.

(10) Patent No.: US 9,995,231 B2
(45) Date of Patent: Jun. 12, 2018

(54) APPARATUS AND METHOD FOR CONTROLLING COLD STARTING OF DIESEL ENGINE VEHICLE

(71) Applicant: Hyundai Motor Company, Seoul (KR)

(72) Inventors: Hyungmin Kim, Ansan-si (KR); Kyoungchan Han, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 290 days.

(21) Appl. No.: 14/755,235

(22) Filed: Jun. 30, 2015

(65) Prior Publication Data

US 2016/0108841 A1    Apr. 21, 2016

(30) Foreign Application Priority Data

Oct. 20, 2014    (KR) .................. 10-2014-0142064

(51) Int. Cl.
*F02D 41/06*    (2006.01)
*F02D 41/40*    (2006.01)
*F02D 35/02*    (2006.01)

(52) U.S. Cl.
CPC ......... *F02D 41/064* (2013.01); *F02D 35/026* (2013.01); *F02D 41/40* (2013.01); *Y02T 10/44* (2013.01)

(58) Field of Classification Search
CPC ...... F02D 41/064; F02D 35/026; F02D 41/40; Y02T 10/44
USPC .................. 123/445; 701/103, 104, 105, 113
See application file for complete search history.

(56) References Cited

U.S. PATENT DOCUMENTS 4,248,192 A * 2/1981 Lampard ................. F02B 19/02
                                              123/256
5,890,467 A * 4/1999 Romzek .............. F02D 41/0087
                                              123/299
5,894,832 A * 4/1999 Nogi ........................ F02D 9/10
                                              123/179.15

(Continued)

FOREIGN PATENT DOCUMENTS

JP           3237512 B2    10/2001
JP        2004-225650 A     8/2004

(Continued)

*Primary Examiner* — Stephen K Cronin
*Assistant Examiner* — Susan Scharpf
(74) *Attorney, Agent, or Firm* — Morgan, Lewis & Bockius LLP

(57) ABSTRACT

A method for controlling a cold starting of a diesel engine vehicle may include determining whether a cold starting condition is satisfied by detecting data for controlling a diesel engine, determining torque generated by combustion for starting the diesel engine when the cold starting condition is satisfied, determining a combustion delay and a combustion phase based on the torque and detected data, determining a main injection timing according to the determined combustion delay and combustion phase, determining a latent heat of fuel based on the torque and detected data, determining a pilot injection amount according to the determined latent heat of fuel, determining a total amount of heat by combustion based on the torque and detected data, determining a main injection amount according to the determined total amount of heat, and controlling an operation of an injector based on the main injection timing, pilot injection amount and main injection amount.

6 Claims, 2 Drawing Sheets

(56) References Cited

U.S. PATENT DOCUMENTS

| | | | | |
|---|---|---|---|---|
| 6,032,642 | A * | 3/2000 | Trumbower | F02D 41/068 123/299 |
| 6,267,097 | B1 * | 7/2001 | Urushihara | F01L 1/34 123/299 |
| 6,273,056 | B1 * | 8/2001 | Shirakawa | F02M 26/28 123/305 |
| 6,276,334 | B1 * | 8/2001 | Flynn | F02B 19/14 123/435 |
| 6,286,482 | B1 * | 9/2001 | Flynn | F02B 1/12 123/25 C |
| 6,516,774 | B2 * | 2/2003 | zur Loye | F02B 1/12 123/299 |
| 7,509,932 | B2 * | 3/2009 | Hara | F02D 35/023 123/90.15 |
| 2003/0089319 | A1 * | 5/2003 | Duvinage | B60H 1/02 123/41.02 |
| 2004/0111199 | A1 * | 6/2004 | Javaherian | F02N 11/0807 701/36 |
| 2011/0100323 | A1 * | 5/2011 | Bradley | F02B 1/12 123/304 |
| 2014/0379242 | A1 * | 12/2014 | Henein | F02D 35/021 701/104 |

FOREIGN PATENT DOCUMENTS

| | | |
|---|---|---|
| JP | 2011-27018 A | 2/2011 |
| KR | 1999-0032213 U | 7/1999 |
| KR | 10-2011-0062068 A | 6/2011 |

\* cited by examiner

APPARATUS AND METHOD FOR CONTROLLING COLD STARTING OF DIESEL ENGINE VEHICLE

CROSS-REFERENCE TO RELATED APPLICATION

The present application claims priority to Korean Patent Application No. 10-2014-0142064 filed Oct. 20, 2014, the entire contents of which is incorporated herein for all purposes by this reference.

BACKGROUND OF THE INVENTION

Field of the Invention

The present invention relates to an apparatus and a method for controlling cold starting of a diesel engine vehicle. More particularly, the present invention relates to an apparatus and a method for controlling cold starting of a diesel engine vehicle that calculates a combustion delay, a combustion phase, a latent heat of a fuel, and a total amount of heat by combustion depending on combustion state, and optimizes combustion state of the diesel engine by controlling a fuel injection amount and a fuel injection timing based on the calculated parameters.

Description of Related Art

Generally, engines are classified into a spark ignition type and a compression ignition type due to an ignition type. An engine of the spark ignition type compresses an air mixture and ignites the air mixture by an electric spark. For example, a gasoline engine is one of the spark ignition types. On the other hand, an engine of the compression ignition type compresses only an air and injects fuel into the air when the air becomes high temperature, so the engine causes a spontaneous combustion. For example, a diesel engine is one of the compression ignition types.

The diesel engine combusts due to compression and ignition, so it is disadvantageous to start the diesel engine in case an exterior temperature is low compared with the gasoline engine. When the exterior temperature is low, an idle RPM of the diesel engine is unstable during starting, so a vapor lock phenomenon of the engine may occur and an incompletely combusted gas may be excessively generated until a coolant temperature increases by a constant temperature.

When an engine speed is higher than or equal to a predetermined speed after a starting motor rotates an engine and an air mixture explode in a combustion chamber of the engine, an engine control unit (ECU) determines that the engine is stably started in the diesel engine. Thus, the ECU controls a fuel amount injected to the engine in order to maintain the engine speed when the engine enters an idle region.

In the conventional engine control system and method, optimal values of engine control parameters are logically inputted to control the engine in a room temperature condition, while engine developers analyze data with respect to an engine starting test to search and apply optimal values in a low temperature condition of the engine. Thus, according to the conventional engine control system and method, since many tests are performed for each temperature and atmospheric pressure condition, development time and cost increase. In addition, power performance of the engine may be deteriorated due to degradation of hardware of an engine system.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing an apparatus and a method for controlling cold starting of a diesel engine vehicle having advantages of determining a combustion delay, a combustion phase, a latent heat of a fuel, and a total amount of heat by combustion depending on combustion state, and optimizing combustion state of the diesel engine by controlling a fuel injection amount and a fuel injection timing based on the determined parameters.

According to various aspects of the present invention, a method for controlling a cold starting of a diesel engine vehicle may include determining, by a controller, whether a cold starting condition is satisfied by detecting data for controlling a diesel engine, determining, by the controller, a torque generated by combustion for starting the diesel engine when the cold starting condition is satisfied, determining, by the controller, a combustion delay and a combustion phase based on the torque generated by the combustion for starting the diesel engine and detected data, determining, by the controller, a main injection timing according to the determined combustion delay and the combustion phase, determining, by the controller, a latent heat of fuel based on the torque generated by combustion for starting the diesel engine and the detected data, determining, by the controller, a pilot injection amount according to the determined latent heat of fuel, determining, by the controller, a total amount of heat by combustion based on the torque generated by the combustion for starting the diesel engine and the detected data, determining, by the controller, a main injection amount according to the determined total amount of heat, and controlling, by the controller, an operation of an injector based on the main injection timing, the pilot injection amount and the main injection amount.

The data may include a coolant temperature and an intake temperature.

The cold starting condition may be satisfied when the coolant temperature is smaller than or equal to a predetermined temperature or the intake temperature is smaller than or equal to a predetermined temperature.

The main injection timing may be advanced when the determined combustion delay is greater than a reference value.

The main injection timing may be advanced when the determined combustion phase is greater than a reference value.

The pilot injection amount may be decreased when the determined latent heat of fuel is greater than a reference value.

The main injection amount may be increased when the total amount of heat by combustion is smaller than a reference value.

The torque generated by combustion for starting the diesel engine may be determined on the basis of an engine output torque and an engine starting torque.

According to various aspects of the present invention, an apparatus for controlling a cold starting of a diesel engine vehicle may include a data detector detecting data for controlling the cold starting of a diesel engine, a controller determining whether a cold starting condition is satisfied by receiving the data from the data detector and controlling an operation of an injector when the cold starting condition is satisfied, and an injector adjusting a fuel injection amount and a fuel injection timing based on a signal transmitted from the controller, in which the controller may determine a main injection timing, a pilot injection amount and a main injection amount by determining a combustion delay, a combustion phase, a latent heat of fuel and a total amount of heat by combustion.

The data detector may include a coolant temperature sensor, an intake air temperature sensor and a combustion pressure sensor.

The controller may be configured to determine that the cold starting condition is satisfied when the coolant temperature is smaller than or equal to a predetermined temperature or the intake temperature is smaller than or equal to a predetermined temperature.

The controller may be configured to determine a torque generated by combustion for starting the diesel engine and determine the combustion delay, the combustion phase, the latent heat of fuel and the total amount of heat by combustion based on the determined torque.

The controller may be configured to determine the main injection timing according to the combustion delay and the combustion phase.

The controller may be configured to advance the main injection timing when the combustion delay is greater than a reference value.

The controller may be configured to advance the main injection timing when the combustion phase is greater than a reference value.

The controller may be configured to determine the pilot injection amount according to the latent heat of fuel.

The controller may be configured to decrease the pilot injection amount when the determined latent heat of fuel is greater than a reference value.

The controller may be configured to determine the main injection amount according to the total amount of heat by combustion.

The controller may be configured to increase the main injection amount when the total amount of heat by combustion is smaller than a reference value.

The controller may be configured to determine the torque generated by combustion for starting the diesel engine based on an engine output torque and an engine starting torque.

As described above, according to various embodiments of the present invention, a fuel injection timing and a fuel injection amount are controlled in accordance with a combustion pressure signal of an engine cylinder, so startability of the diesel engine vehicle can be improved in case of cold starting.

Moreover, it is possible to start the diesel engine with optimizing combustion state of the diesel engine, so fuel efficiency of the diesel engine vehicle can be improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
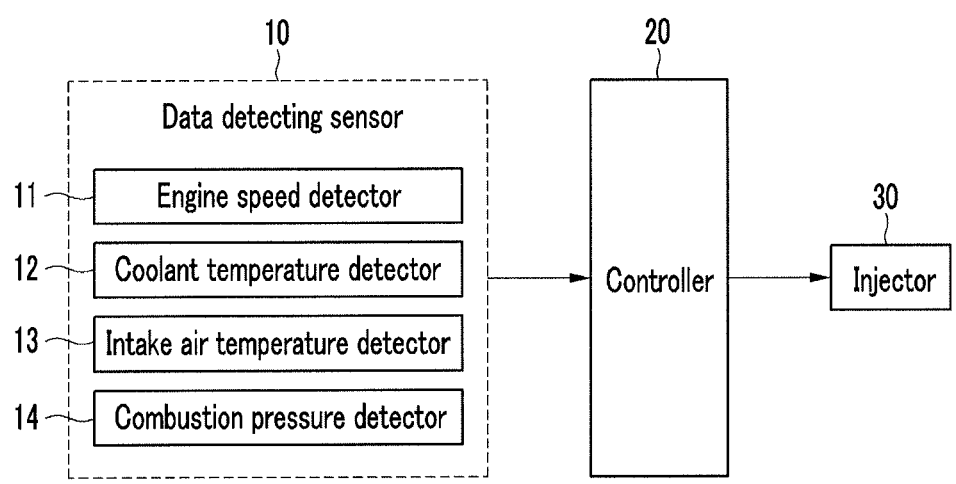
FIG. 1 is a schematic block diagram of an exemplary apparatus for controlling a cold starting of a diesel engine according to the present invention.

FIG. 1 is a schematic block diagram of an apparatus for controlling a cold starting of a diesel engine according to various embodiments of the present invention.

As shown in FIG. 1, an apparatus for controlling a cold starting of a diesel engine according to various embodiments of the present invention includes a data detector 10, a controller 20 and an injector 30.

The data detector 10 includes an engine speed detector 11, a coolant temperature detector 12, an intake air temperature detector 13 and a combustion pressure detector 14.

The engine speed detector 11 may detect a changing engine speed according to a running state of the vehicle. The engine speed detector 11 may be a crankshaft angular sensor or a camshaft angular sensor, but it is not limited thereto.

The coolant temperature detector 12 may detect a changing temperature of coolant according to an operating state of the engine.

The intake air temperature detector 13 may detect an air temperature supplied at an intake manifold.

The combustion pressure detector 14 may detect a combustion pressure of the engine cylinder according to a combustion state.

The controller 20 determines whether a cold starting condition is satisfied by receiving the data from the data detector 10, determines a combustion delay, a combustion phase, a latent heat of fuel and a total amount of heat by combustion when the cold starting condition is satisfied, and determines a main injection timing, a pilot injection amount and a main injection amount based on the determined combustion delay, the combustion phase, the latent heat of fuel and the total amount of heat by combustion.

The controller 20 may determine that the cold starting condition is satisfied when the coolant temperature is smaller than or equal to a predetermined temperature or the intake temperature is smaller than or equal to a predetermined temperature.

The controller 20 may determine the main injection timing according to the combustion delay and the combustion phase. The controller 20 may advance the main injection timing when the combustion delay is increased or the combustion phase is increased.

The controller 20 may determine the pilot injection amount according to the latent heat of fuel. The controller 20 may decrease the pilot injection amount when the latent heat of fuel is increased.

The controller 20 may determine the main injection amount according to the total amount of heat by combustion. The controller 20 may increase the main injection amount when the total amount of heat by combustion is decreased.

As described above, the controller 20 may control an operation of the injector 30 by determining the main injection timing, the pilot injection amount and the main injection amount according to the combustion delay, the combustion phase, the latent heat of fuel and the total amount of heat by combustion.

For these purposes, the controller 20 may be implemented as at least one processor that is operated by a predetermined program, and the predetermined program may be programmed in order to perform each step of a method for controlling a cold starting of a diesel engine according to various embodiments of the present invention.

The injector 30 which is a fuel injection nozzle equipped with a solenoid valve injects fuel by opening the solenoid valve when a current flows through the solenoid valve according to a fuel injection signal output from the controller 20.

The injector 30 adjusts a fuel injection amount and a fuel injection timing according to the main injection timing, the pilot injection amount and the main injection amount determined by the controller 20. Accordingly, combustion state of the engine may be optimized.

Hereinafter, a method for controlling cold starting of a diesel engine vehicle according to various embodiments of the present invention will be described in detail with reference to FIG. 2.

Figure 2:
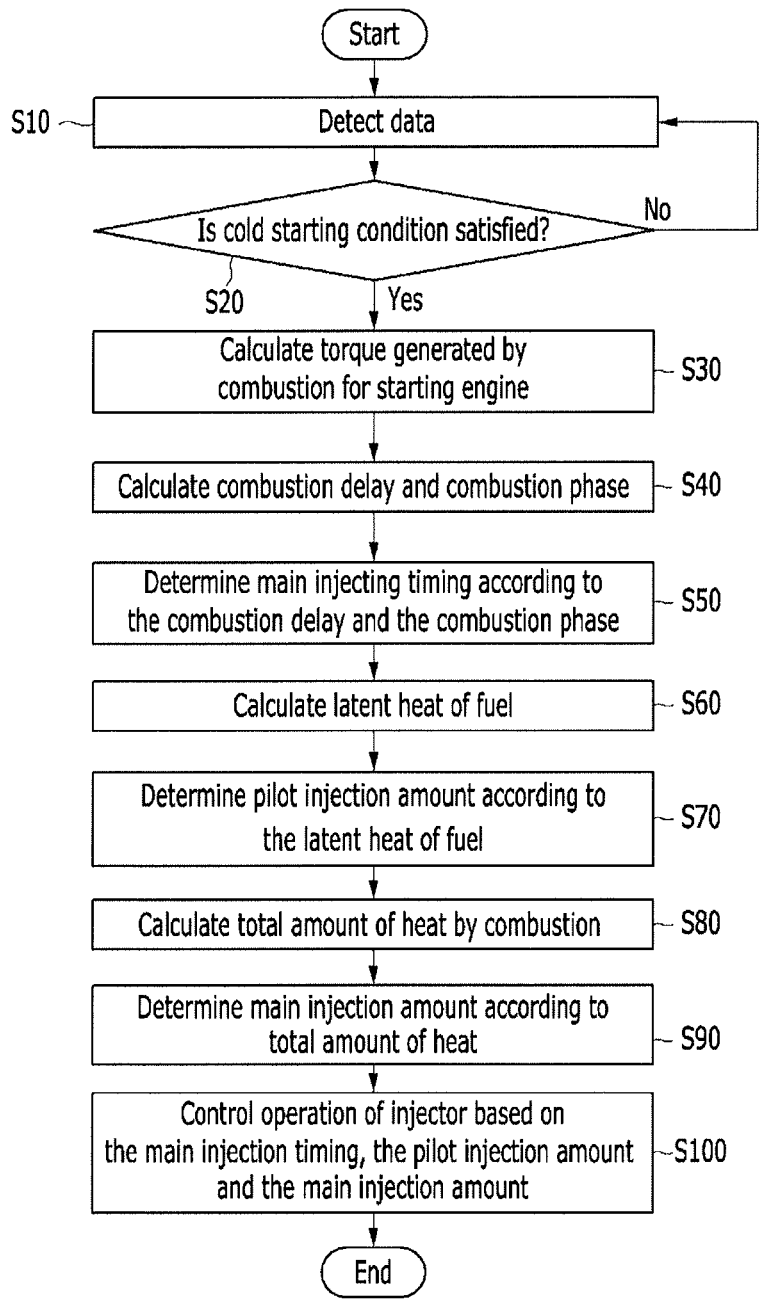
FIG. 2 is a flowchart showing an exemplary method for controlling a cold starting of a diesel engine according to the present invention.

FIG. 2 is a flowchart showing a method for controlling a cold starting of a diesel engine according to various embodiments of the present invention.

As shown in FIG. 2, a method for controlling a cold starting of a diesel engine according to various embodiments of the present invention starts with detecting data for controlling the diesel engine at step S10.

When the data is detected at the step S10, the controller 20 determines whether a cold starting condition is satisfied at step S20.

The cold starting condition may be satisfied when the coolant temperature is smaller than or equal to a predetermined temperature or the intake temperature is smaller than or equal to a predetermined temperature.

When the cold starting condition is satisfied at the step S20, the controller 20 determines a torque generated by combustion for starting the diesel engine at step S30.

The torque generated by combustion for starting the diesel engine may be determined on the basis of an engine output torque and an engine starting torque. Herein, the engine starting torque may be changed depending on a coolant temperature.

When the torque generated by combustion for starting the diesel engine is determined at the step S30, the controller 20 determines a combustion delay and a combustion phase based on the torque generated by combustion at step S40.

The combustion delay may mean a time interval from injecting fuel by the injector 30 until combustion is generated. In addition, the combustion phase which represents 50% mass fraction burned (MFB50) may mean a point of 50% generation amount of total thermal energy generated by a fuel-air mixture that is burned.

When combustion delay and the combustion phase is determined at the step S40, the controller 20 determines a main injection timing according to the combustion delay and the combustion phase at step S50.

If the combustion delay is greater than a reference value, it means combustion begins late, so the controller 20 may advance the main injection timing.

In addition, if the combustion phase is greater than a reference value, it means the combustion phase is retarded, so the controller 20 may advance the main injection timing.

The controller 20 determines a latent heat of fuel based on the torque generated by combustion for starting the diesel engine at step S60.

The latent heat of fuel may mean a heat amount generated when fuel injected into the engine cylinder is atomized.

When the latent heat of fuel is determined at the step S60, the controller 20 determines a pilot injection amount according to the latent heat of fuel at step S70.

If the latent heat of fuel is greater than a reference value, combustion can be negatively influenced by the latent heat of fuel, so the latent heat of fuel should be limited. Thus, the controller 20 may decrease the pilot injection amount when the latent heat of fuel is greater than the reference value.

In addition, the controller 20 determines a total amount of heat by combustion based on the torque generated by combustion for starting the diesel engine at step S80.

When the total amount of heat by combustion is determined at the step S80, the controller 20 determines a main injection amount according to the total amount of heat at step S90.

If the determined total amount of heat by combustion is smaller than a reference value, the controller 20 may increase the main injection amount to maintain a target of the total amount of heat.

After that, the controller 20 controls an operation of the injector 30 based on the main injection timing, the pilot injection amount and the main injection amount at step S100.

As described above, according to various embodiments of the present invention, a fuel injection timing and a fuel injection amount are controlled in accordance with a combustion pressure signal of an engine cylinder, so startability of the diesel engine vehicle can be improved in case of cold starting.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a cold starting of a diesel engine vehicle, comprising:
   determining, by a controller, whether a cold starting condition is satisfied by detecting data for controlling a diesel engine;
   determining, by the controller, a torque generated by combustion for starting the diesel engine when the cold starting condition is satisfied;
   determining, by the controller, a combustion delay and a combustion phase based on the torque generated by the combustion for starting the diesel engine and detected data;
   determining, by the controller, a main injection timing according to the determined combustion delay and combustion phase;
   determining, by the controller, a latent heat of fuel based on the torque generated by combustion for starting the diesel engine and the detected data;
   determining, by the controller, a pilot injection amount according to the determined latent heat of the fuel;
   determining, by the controller, a total amount of heat by combustion based on the torque generated by the combustion for starting the diesel engine and the detected data;
   determining, by the controller, a main injection amount according to the determined total amount of heat; and
   controlling, by the controller, an operation of an injector based on the main injection timing, the pilot injection amount and the main injection amount,
   wherein the main injection timing is advanced when the determined combustion delay is greater than a reference value or when the determined combustion phase is greater than a reference value,
   wherein the pilot injection amount is decreased when the determined latent heat of fuel is greater than a reference value, and
   wherein the main injection amount is increased when the total amount of heat by combustion is smaller than a reference value.

2. The method of claim 1, wherein the data comprises a coolant temperature and an intake temperature.

3. The method of claim 2, wherein the cold starting condition is satisfied when the coolant temperature is smaller than or equal to a predetermined temperature or the intake temperature is smaller than or equal to a predetermined temperature.

4. An apparatus for controlling a cold starting of a diesel engine vehicle, comprising:
   a data detecting sensor detecting data for controlling the cold starting of a diesel engine;
   a controller determining whether a cold starting condition is satisfied by receiving the data from the data detecting sensor and controlling an operation of an injector when the cold starting condition is satisfied; and
   an injector adjusting a fuel injection amount and a fuel injection timing based on a signal transmitted from the controller,
   wherein the controller determines a main injection timing, a pilot injection amount and a main injection amount by determining a combustion delay, a combustion phase, a latent heat of fuel and a total amount of heat by combustion,
   wherein the controller is configured to determine a torque generated by combustion for starting the diesel engine and determine the combustion delay, the combustion phase, the latent heat of fuel and the total amount of heat by combustion based on the determined torque,
   wherein the controller is configured to determine the main injection timing according to the combustion delay and the combustion phase,
   wherein the controller is configured to advance the main injection timing when the combustion delay is greater than a reference value or when the combustion phase is greater than a reference value,
   wherein the controller is configured to determine the pilot injection amount according to the latent heat of fuel,
   wherein the controller is configured to decrease the pilot injection amount when the determined latent heat of fuel is greater than a reference value,
   wherein the controller is configured to determine the main injection amount according to the total amount of heat by combustion, and
   wherein the controller is configured to increase the main injection amount when the total amount of heat by combustion is smaller than a reference value.

5. The apparatus of claim 4, wherein the data detecting sensor comprises a coolant temperature sensor, an intake air temperature sensor and a combustion pressure sensor.

6. The apparatus of claim 5, wherein the controller is configured to determine that the cold starting condition is satisfied when the coolant temperature is smaller than or equal to a predetermined temperature or the intake temperature is smaller than or equal to a predetermined temperature.

* * * * *